United States Patent
Singi et al.

(10) Patent No.: US 10,289,537 B2
(45) Date of Patent: May 14, 2019

(54) SMART ADVISORY FOR DISTRIBUTED AND COMPOSITE TESTING TEAMS BASED ON PRODUCTION DATA AND ANALYTICS

(71) Applicant: Accenture Global Solutions Limited, Dublin (IE)

(72) Inventors: Kapil Singi, Bangalore (IN); Alpana Dubey, Bangalore (IN); Vikrant Kaulgud, Pune (IN)

(73) Assignee: Accenture Global Solutions Limited, Dublin (IE)

(*) Notice: Subject to any disclaimer, the term of this patent is extended or adjusted under 35 U.S.C. 154(b) by 0 days.

(21) Appl. No.: 15/880,797

(22) Filed: Jan. 26, 2018

(65) Prior Publication Data

US 2018/0260313 A1 Sep. 13, 2018

(30) Foreign Application Priority Data

Mar. 9, 2017 (IN) .............................. 201741008322

(51) Int. Cl.
*G06F 9/44* (2018.01)
*G06F 11/36* (2006.01)
*G06F 16/901* (2019.01)

(52) U.S. Cl.
CPC ...... *G06F 11/3688* (2013.01); *G06F 11/3636* (2013.01); *G06F 16/9024* (2019.01)

(58) Field of Classification Search
None
See application file for complete search history.

(56) References Cited

U.S. PATENT DOCUMENTS

| 7,480,900 B1* | 1/2009 | Zhou ................... G06F 11/3676 717/132 |
| 9,208,324 B2 | 12/2015 | Chauhan et al. |
| 2008/0263505 A1 | 10/2008 | StClair et al. |
| 2012/0023485 A1 | 1/2012 | Dubey et al. |
| 2015/0082442 A1 | 3/2015 | Chauhan et al. |
| 2017/0091460 A1 | 3/2017 | Kuhr et al. |

OTHER PUBLICATIONS

Australian Patent Office, Examination Report No. 1 in Australian Application No. 2018200523 dated May 1, 2018, pp. 1-5.
Examination Report No. 2 for Australian Application No. 2018200523, dated Aug. 20, 2018, pp. 1-4.

* cited by examiner

*Primary Examiner* — Qamrun Nahar
(74) *Attorney, Agent, or Firm* — Brinks Gilson & Lione

(57) ABSTRACT

An application testing developer system provides a platform for generating real-time suggestions for allocating test cases to testers in a distributed environment based on monitored characteristics from previous testing of a test application. The application testing developer system includes a smart advisory tool that optimizes test case allocation in real-time, adaptively assigns incentives in real-time to test cases for prioritizing testing of certain test cases over others, and monitors and validates testing activities.

18 Claims, 15 Drawing Sheets

500

| Use Test Cases | Execution Trace (Application Nodes) |
|---|---|
| Test Case 1 (TC1): Account balance inquiry | 1, 2, 3, 4, 5, 6, 7, 9 |
| Test Case 2 (TC2): Account balance inquiry | 1, 2, 3, 4, 5, 6, 7, 8, 10 |
| Test Case 3 (TC3): Money transfer | 1, 11, 12, 13, 14, 15, 16 |
| Test Case 4 (TC4): Add Beneficiary | 1, 11, 17, 18, 19, 20 |

| Tester's Execution Trace for Validation |
|---|
| Test Execution of Test Case 1 (TC1): Successful, Complete Execution of all Action Steps |
| Step 1: Application Login Successful |
| Step 2: Account Balance Inquiry clicked |
| Step 3: Account selected |
| Step 4: View account button clicked |
| Step 5: Select period button clicked |
| Step 6: Download statement clicked |
| Step 7: Pdf selected |
| Step 9: Download clicked |
| Test Execution of Test Case 2 (TC2): Partial, Incomplete Execution |
| Step 1: Application Login Successful |
| Step 2: Account Balance Inquiry clicked |
| Step 3: Account selected |
| Step 4: View account button clicked |
| Steps 5-8 and 10: Incomplete execution |
| Test Execution of Test Case 3 (TC3): Successful, Complete Execution of all Action Steps |
| Step 1: Application Login Successful |
| Step 11: Money Transfer clicked |
| Step 12: Select beneficiary clicked |
| Step 13: Amount entered in text box |
| Step 14: Description entered |
| Step 15: Email id entered |
| Step 16: Transfer clicked |
| Test Execution of Test Case 4 (TC4): Partial, Incomplete Execution |
| Step 1: Application Login Successful |
| Step 11: Money Transfer clicked |
| Step 17: Add beneficiary clicked |
| Step 18: Account details entered |
| Steps 19 and 20: Incomplete execution |

| Application Feature | Tester 1 | Tester 2 | Tester 3 |
|---|---|---|---|
| F1: Application Login Feature | 0.50 | 0.34 | 0.12 |
| F2: Support Feature | 0.23 | 0.41 | 0.45 |
| F3: Brokerage Feature | 0.55 | 0.61 | 0.35 |
| F4: Application Log Out Feature | 0.20 | 0.48 | 0.41 |

Figure 15

SMART ADVISORY FOR DISTRIBUTED AND COMPOSITE TESTING TEAMS BASED ON PRODUCTION DATA AND ANALYTICS

CROSS-REFERENCE TO RELATED APPLICATION(S)

This application claims priority to India Patent Application No. 201741008322, filed Mar. 9, 2017, the entirety of which is hereby incorporated by reference herein.

BACKGROUND

The development of a new computer-run application may include a testing phase where testers are tasked with utilizing draft versions of the application to test certain features of the application. With the complexity of the applications that are being developed, a greater number of testers is required to devote many man hours of time to go through and test the many features of the applications. Testing teams may be created to be distributed geographically so that remote teams of testers are assigned testing tasks for a common application. The testing teams may also be grouped according to composite teams such as a project team, an internal crowd team, an external crowd team, and a beta users team.

Within the field of enterprise solution applications, the high velocity of business innovations and application development has created a need for adaptive software engineering. Specifically during the testing stage of an application, there are several important questions that arise in order to achieve a truly adaptive application testing software engineering result. For one, are the testers performing their task effectively? Second, are the testers testing the right components of the app? And finally, how can the testers be rewarded or incentivized for successfully completing an assigned task effectively? The answers to these questions are especially relevant when the testing team is geographically distributed to be working from different locations and composited across different sub-groups such that there may not be daily face to face interaction between the testers and the test managers who are responsible for assigning the testing tasks to the individual testers and overseeing the overall application testing process.

It follows that within the context of high velocity application development, test managers may run into the technical problem of not having available a 'data driven' approach to adapting testing for such high velocity application development.

DESCRIPTION OF THE FIGURES

FIG. 5 shows an exemplary test case-test execution trace mapping table.

FIG. 13 shows an exemplary execution trace and validation table.

FIG. 15 shows an exemplary work allocation score table.

DETAILED DESCRIPTION

Figure 1:
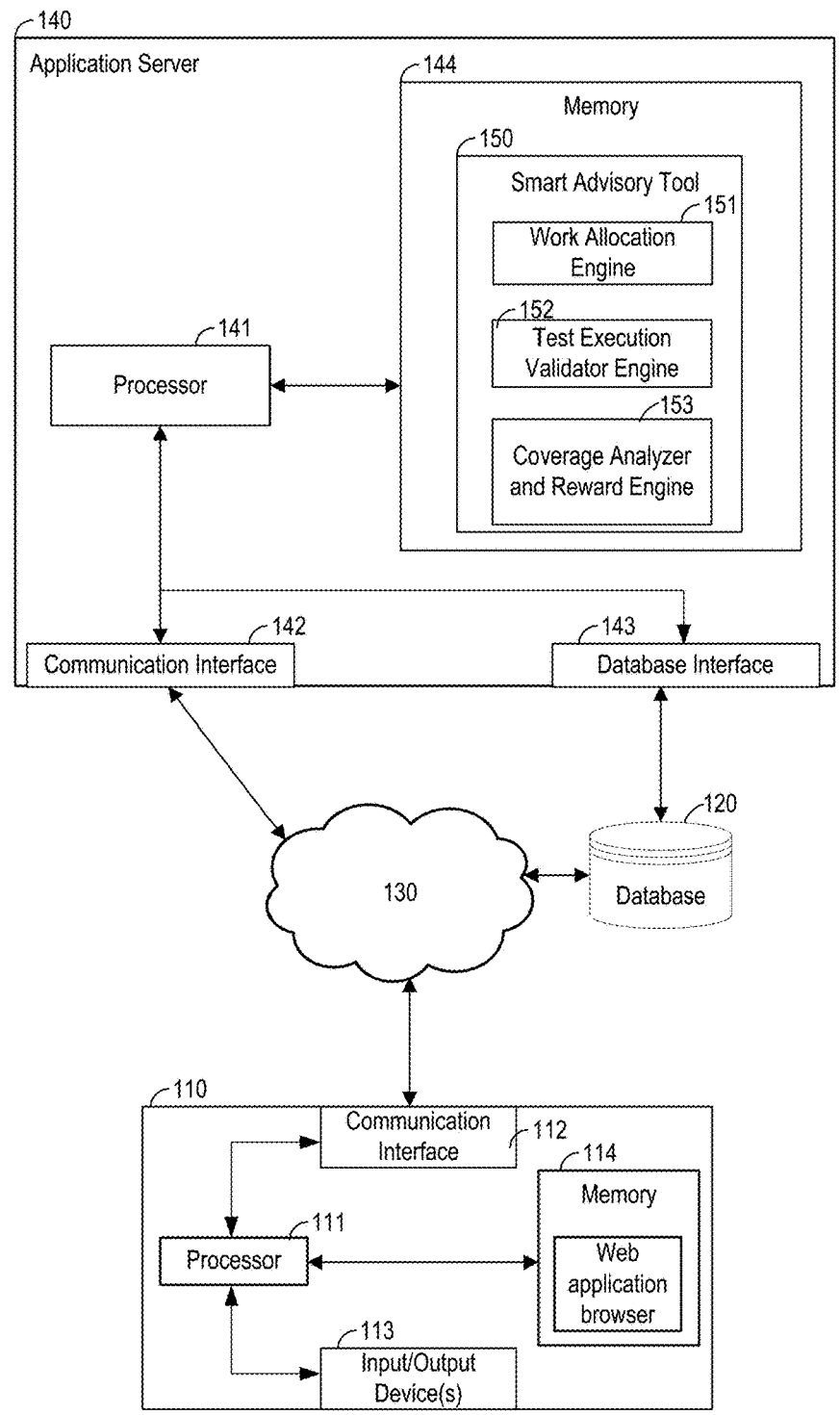
FIG. 1 shows an exemplary application testing developer system.

The methods, devices, systems, and other features discussed below may be embodied in a number of different forms. Not all of the depicted components may be required, however, and some implementations may include additional, different, or fewer components from those expressly described in this disclosure. Variations in the arrangement and type of the components may be made without departing from the spirit or scope of the claims as set forth herein. Further, variations in the processes described, including the addition, deletion, or rearranging and order of logical operations, may be made without departing from the spirit or scope of the claims as set forth herein.

The demand for rapid software delivery is increasing greatly and organizations are adopting various methodologies and alternative workforces to achieve this. For instance, organizations are adopting human resources available on crowdsourcing platforms and freelancing platforms to reduce the time taken in various software development activities that includes application testing. These platforms provide a medium to search for application testing tasks and get the application testing tasks done by a set of crowd sourced testers or freelance testers. Moreover, organizations may use internal crowdsourcing platforms to optimize their employee pool allocation where employees subscribe to the internal platform and jobs (e.g., test cases for testing specific application features) are allocated based on the employees' interest and known expertise that relate to application features being tested. This strategy results in a better utilization of resources.

However, this solution may also result in an extremely distributed testing team that poses challenges related to lack of common awareness, coordination, and communication. For instance, in the crowdsourced testing scenario, multiple testers might test the same set of scenarios because of the lack of awareness of what other testers are testing. Hence, crowdsourced testing is expected to have redundancies in testing efforts. Some crowdsourced testing platforms may guide testers to focus their effort on specific aspect of the software application. However, as the guidance is only provided at a higher granularity level, redundancies still exist without coordinate at the tester level to assign specific test cases to the individual testers. Moreover, unlike traditional testing teams, in which test managers have a better control over the testers and understanding of their behavior, in crowdsourced testing teams test managers have very little control and understanding of testers' behavior. Hence, testers might not be assigned tasks based on their strengths.

Within this context of high velocity application development, test managers may run into the technical problem of not having available a 'data driven' approach to adapting testing for such high velocity application development.

In this disclosure, a technological solution is described that utilizes production data and analytics to provide insights to test managers and testers working together to test an application in a crowd sourced testing environment. This solution includes a smart advisory tool that serves to optimize test case allocation in real-time, adaptively assign incentives in real-time to test cases to prioritize testing of certain test cases over others, and monitor and validate testing activities. As part of the solution, the smart advisory tool is used to show role-specific alerts in an intuitive manner. The smart advisory tool may also offer an optional conversational interface to present information to a user (e.g., test manager or tester).

For exemplary purposes, the smart advisory tool is described as being a web-based application running on a web server and accessible by remote users. The web-based application is generally understood to be an application stored and configured to operate, at least in part, on the web server which is accessible to other communication devices connected to a common communication network. A user operating their communication device may communicate with the web-server through the common communication network to access and operate the web-based application. The web-based application offers many advantages, such as accessibility to remote users, based on its framework being stored on a web server(s).

In addition or alternatively, the smart advisory tool may also be a local application running and accessible on a local device. The local installation implementation of the smart advisory tool may offer some security advantages over the web-based application implementation as outside devices are not readily offered access to the local device running the smart advisory tool. The local device may be, for example, a computing device operated by the test manager in the application testing developer system described herein.

An application testing developer system may include a database for storing historical test data that includes testing performance data of individual testers, execution trace data describing test cases that have been tested, and application feature data describing testable features of an application being tested. The database may also store tester attribute data describing, for example, strengths and weaknesses of a tester's abilities based on an analysis of the tester's historical testing performance data. The application testing developer system may access the database to reference the stored data when generating recommended test case allocation and incentive assignment for testing an application by a testing team of testers.

These and other features of the application testing developer system are described in this disclosure.

FIG. 1 illustrates an exemplary application testing developer system 100 that includes component devices for implementing the described features. The application testing developer system 100 includes an application server 140 configured to include the hardware, software, circuitry, and/or middleware for operating the described smart advisory tool 150. Application server 140 is shown to include a processor 141, a memory 144, a communication interface 142, and a database interface 143. The smart advisory tool 150 may be operated as part of an add-on tool for another developer tool also running on the application server 140. Alternatively, the smart advisory tool 150 may be run independently of another developer tool. According to some embodiments, portions, or all, of the smart advisory tool 150 may be running on a communication device 110 that is in communication with the application server 140 through a network 130.

The application testing developer system 100 may further include a database 120 for storing historical test data that includes testing performance data of individual testers, execution trace data describing test cases that have been tested, and application feature data describing testable features of an application being tested. The database 120 may further store tester attribute data describing, for example, strengths and weaknesses of a tester's testing abilities based on an analysis of the tester's historical testing performance data. Some of the data stored on the database 120 may have been uploaded by the communication device 110 directly (e.g., tester attribute data, application featured data). Other data stored on the database 120 may have been stored by the smart advisory tool 150 in an on-going adaptive response to test cases being executed during a testing process of the application being tested. Information and data stored on the database 120 may be communicated directly to the smart advisory tool 150 through the database interface 143, or through the communication interface 142 via the network 130.

The application testing developer system 100 may include communication between the application server 140 and any number and type of client devices, as represented by the communication device 110. The communication device 110 may be responsible for running at least parts of the smart advisory tool 150, in particular when the smart advisory tool 150 is a web application that may be accessed remotely by the communication device 110. The communication device 110 may include well known computing systems, environments, and/or configurations that may be suitable for implementing features of the smart advisory tool 150 such as, but are not limited to, smart phones, tablet computers, personal computers (PCs), server computers, handheld or laptop devices, multiprocessor systems, microprocessor-based systems, network PCs, server computers, minicomputers, mainframe computers, embedded systems, distributed computing environments that include any of the above systems or devices, and the like.

FIG. 1 shows that the communication device 110 includes a processor 111, a memory 114 configured to store the instructions for operating a web application browser, an input/output devices 113, and a communication interface 112. A user operating the communication device 110 may run the web application browser to access the smart advisory tool 150 running on the application server 140. As mentioned, according to some embodiments at least some portions of the smart advisory tool 150 may be stored on the memory 114 and/or be operated to run on the communication device 110.

The smart advisory tool 150 may be implemented in software, hardware, circuitry, and/or middleware configured to implement features described herein, such as for the monitoring of tester actions during the testing process, and the adaptive response of allocating test cases to testers based on the current state of the testing process and the known performance and attributes of the testers. The smart advisory tool 150 may also be responsible for the adaptive response of assigning updated incentive values to test cases based on the current state of the testing process and the known performance and attributes of the testers. The smart advisory tool 150 may also be responsible for validating test cases that have been executed by testers during the testing process.

To accomplish these and other features, the smart advisory tool 150 may include a work allocation engine 151, a test execution validator engine 152, and a coverage analyzer and reward engine 153. Each of the work allocation engine 151, the test execution validator engine 152, and the coverage analyzer and reward engine 153 may be a representation of software, hardware, circuitry, and/or middleware configured to implement respective features of the smart advisory tool 150.

The work allocation engine 151 may be configured to receive information identifying a list of available testers, each tester's historical testing performance data that may include a history of test cases executed by the tester, and application feature data that describes one or more application features of the application being tested that may be tested. Based on the received information, the work allocation engine 151 may output a recommended proposal including a list of selected testers for assigning to a particular test case that tests a particular feature of the application. The selected testers may have been selected by the work allocation engine 151 after determining that the selected testers have previously executed test cases similar to the particular test case. According to some embodiments, the list of selected testers may be arranged in an order where testers having a greater efficiency and/or effectiveness when having previously executed similar test cases may be promoted higher than those testers determined to have had a lower efficiency and/or effectiveness when having previously executed similar test cases. According to some embodiments, the work allocation engine 151 may further filter the selected testers from the list by removing selected testers that are determined not to be available for testing the particular test case. A tester's availability may be determined based on their work schedule or geographic location of the tester relative to the test manager.

The test execution validator engine 152 may be configured to receive information identifying a tester's historical testing performance data (e.g., including tester's test case execution trace data), and identifying test case details that describe each step/node in a test case identified as being executed (or partially executed) from the tester's historical testing performance data. The test execution validator engine 152 may then determine whether the tester has completed testing for a particular test case by matching the testing steps identified in the tester's historical execution trace data with the testing steps that are identified to be included in the particular test case. When the test execution validator engine 152 determines that the tester has executed each testing step described in the particular test case, the test execution validator engine 152 may validate that the tester has successfully executed the particular test case (e.g., executed all the test steps for the particular test case). The test execution validator engine 152 may map each test step described by the tester's historical execution trace data as being executed against the known test steps for test cases of the application being tested to determine which test cases can be validated as being successfully executed by the tester.

The coverage analyzer and reward engine 153 may be configured to receive application feature data, test case details information, historical test case execution trace data, and application feature weightage information. Based on the received information, the coverage analyzer and reward engine 153 may then generate reward values for each test case, where the varying reward values provide the testers with an incentive to execute test cases having the higher reward values before test cases having the lower reward values. As the tester executes test cases, the tester will be assigned the corresponding reward values each test case validated by the test execution validator engine 152 as being successfully executed. Testers may later be compensated based on a value of the rewards the tester is able to obtain through their execution of test cases. The coverage analyzer and reward engine 153 may further update and revise the reward values assigned to the test cases as the testers continue to execute test cases during the testing process of the application being tested.

Figure 2:
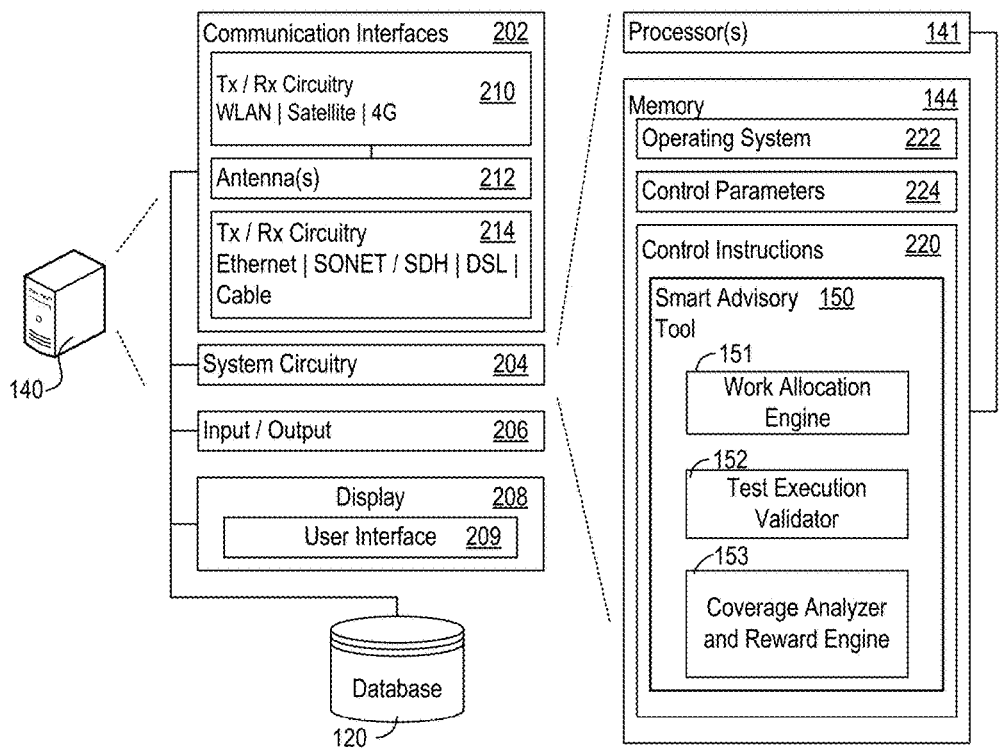
FIG. 2 shows an exemplary computer architecture of an application server running a smart advisory tool from the application testing developer system shown in FIG. 1.

FIG. 2 shows an exemplary embodiment of the application server 140 configured to execute the features attributed to the smart advisory tool 150. The application server 140 includes communication interfaces 202 (e.g., communication interface 142 and database interface 143), system circuitry 204, input/output interfaces 206, and a display 208 on which the application server 140 may generate a user interface 209 according to the smart advisory tool 150.

The user interface 209 and the input/output interfaces 206 may include a graphical user interface (GUI), touch sensitive display, voice or facial recognition inputs, buttons, switches, speakers and other user interface elements. Additional examples of the input/output interfaces 206 include microphones, video and still image cameras, headset and microphone input/output jacks, Universal Serial Bus (USB) connectors, memory card slots, and other types of inputs. The input/output interfaces 206 may further include magnetic or optical media interfaces (e.g., a CDROM or DVD drive), serial and parallel bus interfaces, and keyboard and mouse interfaces. According to some embodiments, the user interface 209 may prompt a user (e.g., test manager or tester) to input data into the smart advisory tool 150, such as selecting testers to assign to a testing schedule or inputting tester attribute information. The user may then input data through the input/output interfaces 206 to be stored on the memory 144 or the database 120.

The communication interfaces 202 may include wireless transmitters and receivers ("transceivers") 210 and any antennas 212 used by the Tx/Rx circuitry of the transceivers 210. The transceivers 210 and antennas 212 may support WiFi network communications, for instance, under any version of IEEE 802.11, e.g., 802.11n or 802.11ac. The communication interfaces 202 may also include wireline transceivers 214. The transceivers 214 may provide physical layer interfaces for any of a wide range of communication protocols, such as any type of Ethernet, data over cable service interface specification (DOCSIS), digital subscriber line (DSL), Synchronous Optical Network (SONET), or other protocol.

The system circuitry 204 may include any combination of hardware, software, middleware, circuitry, firmware, or other logic. The system circuitry 204 may be implemented, for example, with one or more systems on a chip (SoC), application specific integrated circuits (ASIC), microprocessors, discrete analog and digital circuits, and other circuitry. The system circuitry 204 is part of the implementation of any desired functionality in the smart advisory tool 150. As just one example, the system circuitry 204 may include one or more instruction processors 141 and memory 144. The memory 144 stores, for example, control instructions 220 for implementing the smart advisory tool 150, as well as instructions for an operating system 222. The control instructions 220 may include, for example, control instructions for implementing the smart advisory tool 150. For example, the control instructions may include instructions for the work allocation engine 151, the test execution validator engine 152, and the coverage analyzer and reward engine 153. The processor 216 may execute the control instructions 220 and the operating system 222 to carry out any desired functionality for the smart advisory tool 150 running on the application server 140.

The control parameters 224 may provide and specify configuration and operating options for the control instructions 220, operating system 222, and other functionality of the smart advisory tool 150.

The application server may also include storage devices (e.g., hard disk drives (HDDs) and solid state disk drives (SDDs)), as represented by the memory 144 or the database 120. The database 120 may define tables storing historical test execution data, application feature data, and/or tester attribute data.

To access the smart advisory tool 150 running on the application server 140, a user may control their communication device 110 to access the application server 140 and the smart advisory tool 150. The smart advisory tool 150 may then be executed by through the communication device 110.

Figure 3:
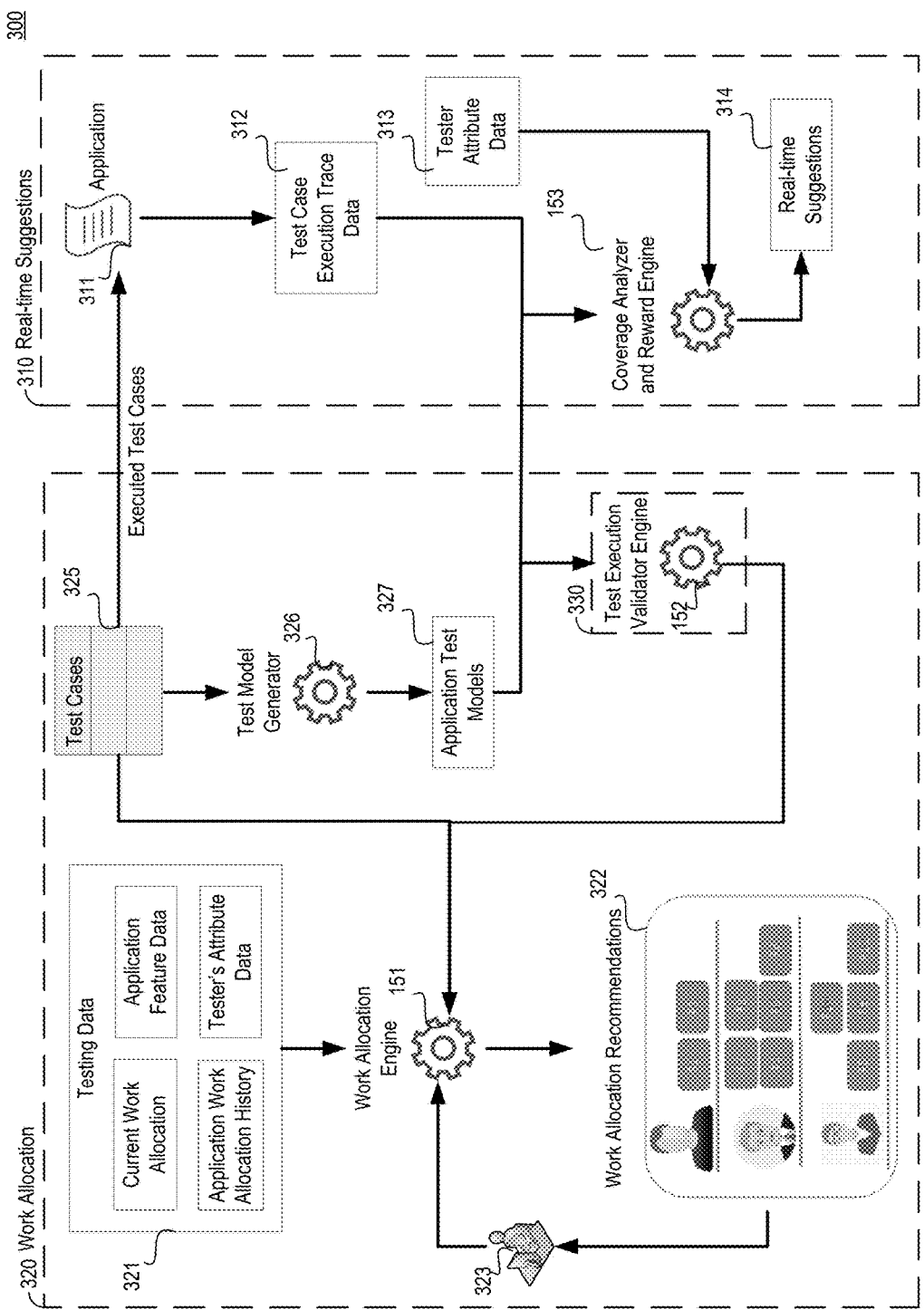
FIG. 3 shows an exemplary block diagram that includes exemplary components and corresponding processes for the smart advisory tool.

FIG. 3 shows an exemplary block diagram 300 that includes exemplary components and corresponding processes for the smart advisory tool 150. The block diagram 300 is configured to implement three logical processes of the smart advisory tool 150: 1) a real-time suggestions process 310, 2) a work allocation process 320, and 3) a test execution validation process 330.

Figure 4:
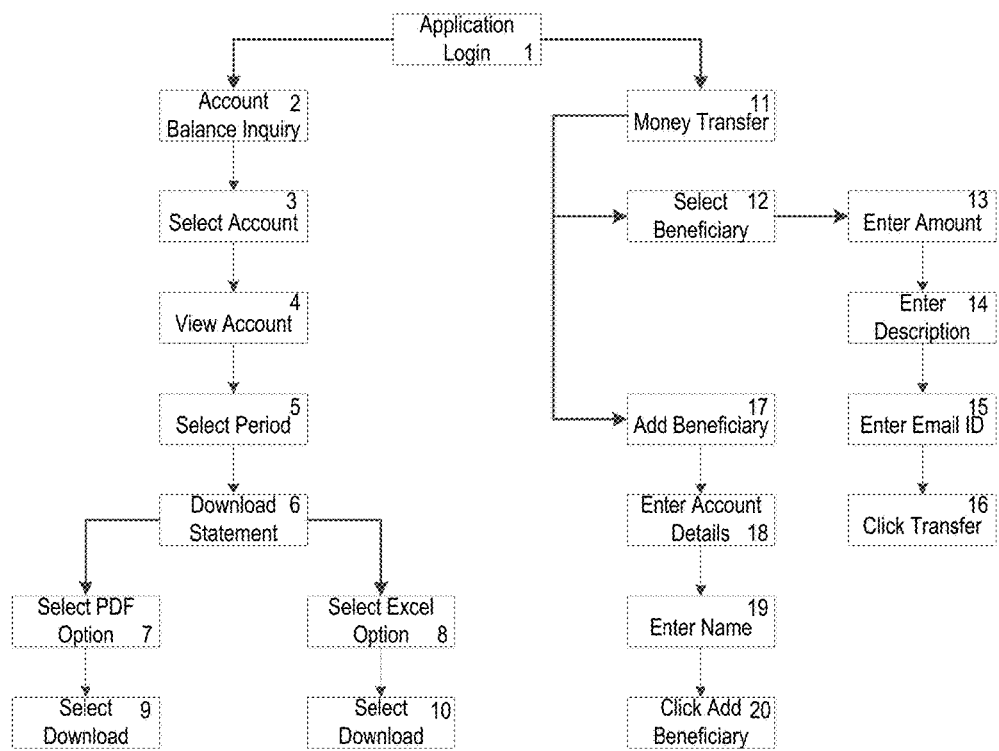
FIG. 4 shows an exemplary application tree describing features of an application to be tested using the smart advisory tool.

The real-time suggestions process 310 may be implemented by the coverage analyzer and reward engine 153. During the real-time suggestions process 310, the coverage analyzer and reward engine 153 may monitor testing of an application 311. The testing process may be executed according to one or more test cases 325 that are generated for testing application features of the application 311. To illustrate the application features that may be included in the application 311, FIG. 4 illustrates an exemplary application tree 400 describing features of the application 311 that may be tested.

The application tree 400 includes twenty (20) distinct application nodes (i.e., process steps within the application), where each application node in the application tree 400 represents a distinct process step available in the application 311. For example, a first node 1 is representative of an application login step available to a user of the application 311. A second node 2 is representative of an account balance inquiry step available to a user of the application 311. And an eleventh node 11 is representative of a money transfer step available to a user of the application 311, and so on through a twentieth node 20 that is representative of a click to add a beneficiary step available to a user of the application 311. A string of one or more application nodes from the application tree 400 combine to represent a test case.

For example, FIG. 5 shows an exemplary test case-test execution trace mapping table 500. The test case-test execution trace mapping table 500 includes a description of four unique test cases corresponding application features of application 311. The description of the four unique test cases in the test case-test execution trace mapping table 500 includes an identification of the specific application nodes that are included in the test cases. For example, test case 1 (TC1) corresponds to an account balance inquiry application feature, where TC1 includes application nodes 1, 2, 3, 4, 5, 6, 7, 9 as identified in the application tree 400. In other words, to validate a complete execution of TC1, a test will have to execute all of application nodes 1, 2, 3, 4, 5, 6, 7, 9 as identified in the application tree 400. Test case 2 (TC2) corresponds to an account balance inquiry application feature, where TC2 includes application nodes 1, 2, 3, 4, 5, 6, 7, 8, 10 as identified in the application tree 400. Test case 3 (TC3) corresponds to a money transfer application feature, where TC3 includes application nodes 1, 11, 12, 13, 14, 15, 16 as identified in the application tree 400. Test case 4 (TC4) corresponds to an add beneficiary application feature, where TC4 includes application nodes 1, 11, 17, 18, 19, 20 as identified in the application tree 400. Though not expressly illustrated, other application features that include a different combination of application nodes may also be available for application 311.

Referring back to the real-time suggestions process 310 shown in FIG. 3, the coverage analyzer and reward engine 153 may further implement the real-time suggestions process 310 by obtaining test case execution trace data 312 from monitoring the testing process on the application 311. The coverage analyzer and reward engine 153 may further obtain tester attribute data 313 (e.g., strength, weakness, opportunities, or threat (SWOT)). The tester attribute data 313 may have been directly uploaded by a tester. Alternatively, the smart advisory tool 150 may generate portions of the tester attribute data that calculates a tester's strengths and weaknesses when testing different application features, as well as a tester's effectiveness and efficiencies. The coverage analyzer and reward engine 153 may further obtain application test models 327, where the application test models 327 may include the application tree 400, as well as a reward value or weight assigned to each node in the application tree 400.

Based on the received data and information, the coverage analyzer and reward engine 153 may generate real-time suggestions 314 describing suggested test cases for testing, and for assigning certain test cases to specific testers. The quality of the real-time suggestions 314 is dependent on the amount of data and information the coverage analyzer and reward engine 153 receives to generate the real-time suggestions 314. The real-time suggestions 314 may further be updated to reflect new reward values assigned to the test cases as other test cases are validated as being successfully executed by testers.

Figure 6:
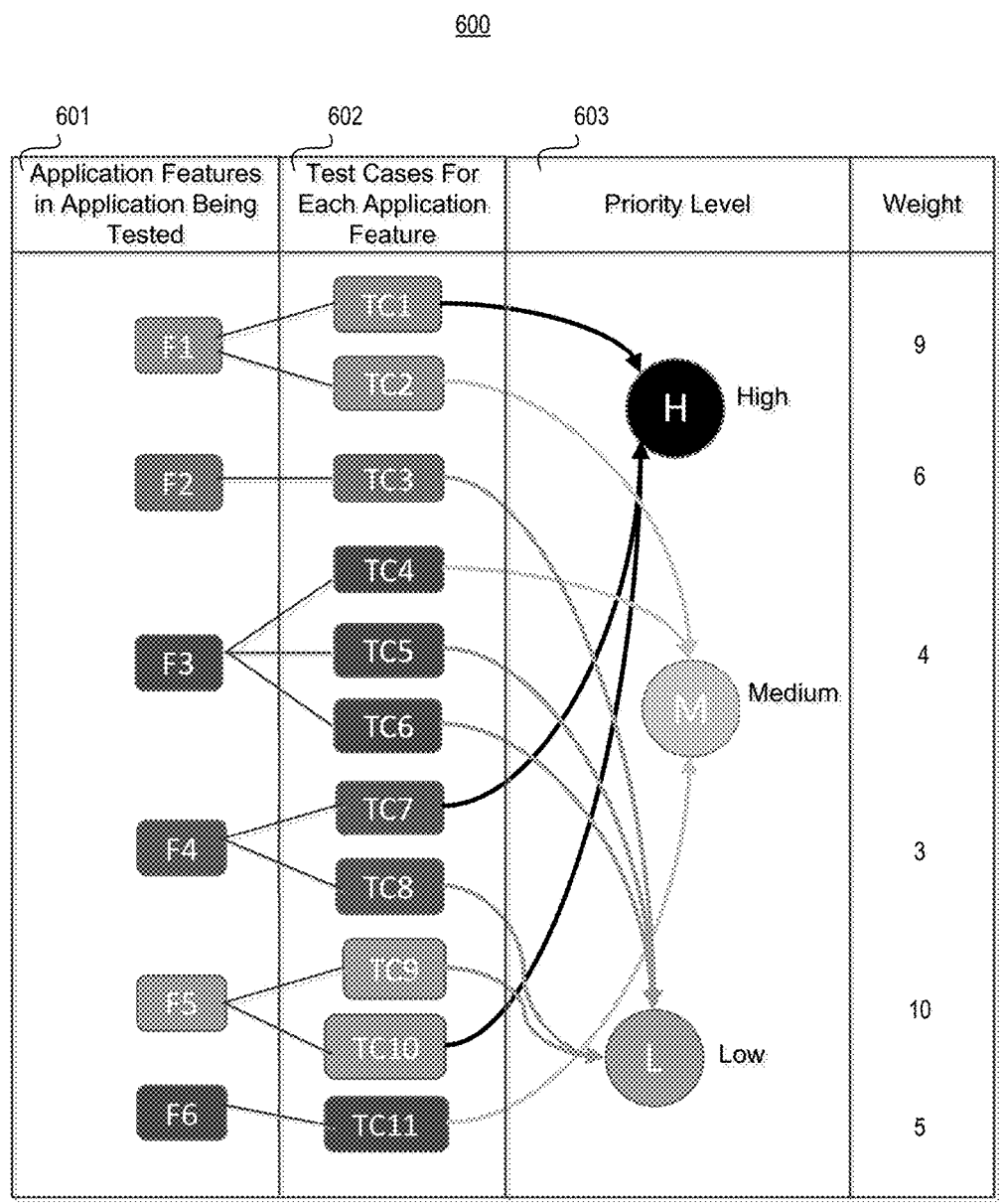
FIG. 6 shows an exemplary feature-priority mapping table.

FIG. 6 illustrates an exemplary feature-priority mapping table 600 that includes application features 601 included in, for example, the application 311 being tested. The table 600 further includes exemplary test cases 602 that are mapped to the application features 601. The table 600 further includes priority levels assigned by the smart advisory tool 150 to the test cases 602. And the table 600 further includes weight values that are assigned by the smart advisory tool 150 to the application features 601.

The table 600 describes application feature F1 as including test cases TC1 and TC2, where TC1 has been tagged as having a high priority and TC2 has been tagged as having a medium priority. The table 600 describes application feature F2 as including test case TC3, where TC3 has been tagged as having a low priority. The table 600 describes application feature F3 as including test cases TC4, TC5, and TC6, where TC4 has been tagged as having a medium priority, TC5 has been tagged as having a low priority, and TC6 has been tagged as having a low priority. The table 600 describes application feature F4 as including test cases TC7 and TC8, where TC7 has been tagged as having a high priority and TC8 has been tagged as having a low priority. The table 600 describes application feature F5 as including test cases TC9 and TC10, where TC9 has been tagged as having a low priority and TC10 has been tagged as having a high priority.

The table 600 describes application feature F6 as including test case TC11, where TC11 has been tagged as having a medium priority.

The table 600 also describes application feature F1 being assigned a weighted value of 9, application feature F2 being assigned a weighted value of 6, application feature F3 being assigned a weighted value of 4, application feature F4 being assigned a weighted value of 3, application feature F5 being assigned a weighted value of 10, and application feature F6 being assigned a weighted value of 5.

Figure 7:
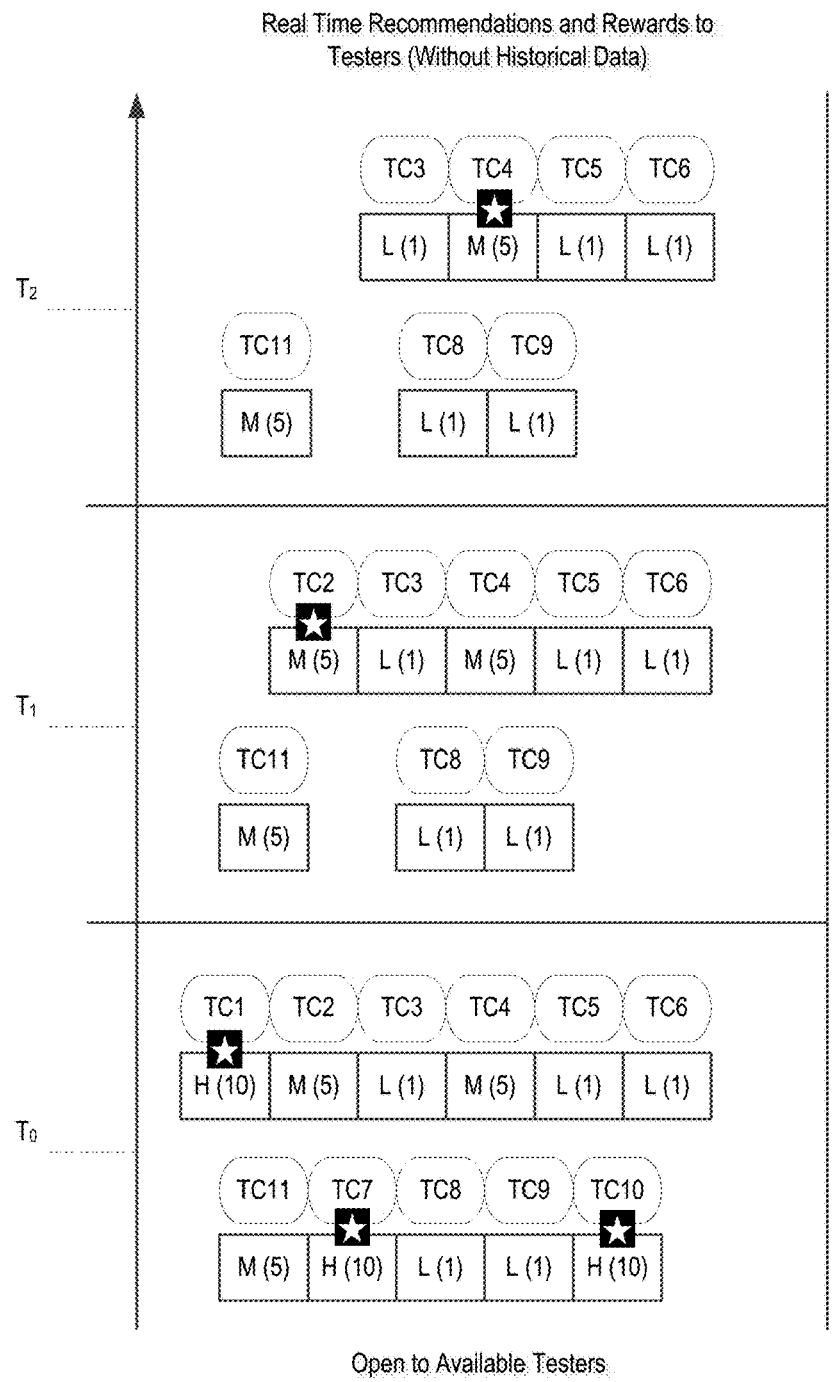
FIG. 7 shows an exemplary test case recommendation diagram for when historical data is not available.

Each of the priority levels may correlate to a set reward value. For example, the exemplary test case recommendation diagram 700 shown in FIG. 7 depicts test cases tagged with a high priority may be assigned a reward value of 10, test cases tagged with a medium priority may be assigned a reward value of 5, and test cases tagged with a low priority may be assigned a reward value of 1. The test case recommendation diagram 700 illustrated in FIG. 7 includes real-time recommendations generated by the coverage analyzer and reward engine 153 when historical test data is not available, or very little historical test data is available. This may occur at the beginning of the testing process for the application 311.

The real-time recommendations described in the test case recommendation diagram 700 is generated for a set of all available testers. This is because enough historical test data is not yet available to make a recommendation of assigning specific testers to test specific test cases.

At time $T_0$, each test case from TC1-TC10 is assigned their own reward value based on their respective priority levels (e.g., priority level described from table 600). So test cases assigned a high priority level may be set to have a reward value of 10, test cases assigned a medium priority level may be set to have a reward value of 5, and test cases assigned a low priority level may be set to have a reward value of 1. This is the reward value setting scheme enacted by the test case recommendation diagram 700, however other reward value setting scheme are also within the scope of the smart advisory tool 150.

At time $T_0$, each test case from TC1-TC10 is made available for the available testers to select for execution. With the higher priority test cases set to have the higher reward values, the testers will likely select the higher priority test cases before selecting the lower priority test cases. So in test case recommendation diagram 700, test cases TC1, TC7, and TC10 are shown to be selected first by the testers (as marked by the star tags) based on test cases TC1, TC7, and TC10 having the highest reward values.

At time $T_1$, test cases TC1, TC7, and TC10 are no longer available due to testers having selected these test cases at time $T_0$. So at $T_1$, high priority test cases are no longer available, and thus a tester is shown to select test case TC2 having a medium priority, and corresponding reward value 5, as the next test case for execution.

At time $T_2$, test cases TC1, TC7, TC10, and TC2 are no longer available due to testers having selected these test cases at time $T_0$ and $T_1$. So at $T_2$, medium priority test cases TC4 and TC11 are still available, and thus a tester is shown to select test case TC4 having a medium priority, and corresponding reward value 5, as the next test case for execution.

While the real-time suggestion depicted by the test case recommendation diagram 700, for when historical test data is not readily available, may be effective in having higher priority test cases being selected by testers for execution based on the assignment of higher reward values, the real-time suggestion is not specialized. This means that without the historical test data, the real-time suggestion generated by the smart advisory tool 150 has not selected specific testers for testing specific test cases based on the specific tester having been analyzed and selected by the smart advisory tool 150 for being more efficient or effective in testing the specific test cases.

Figure 8:
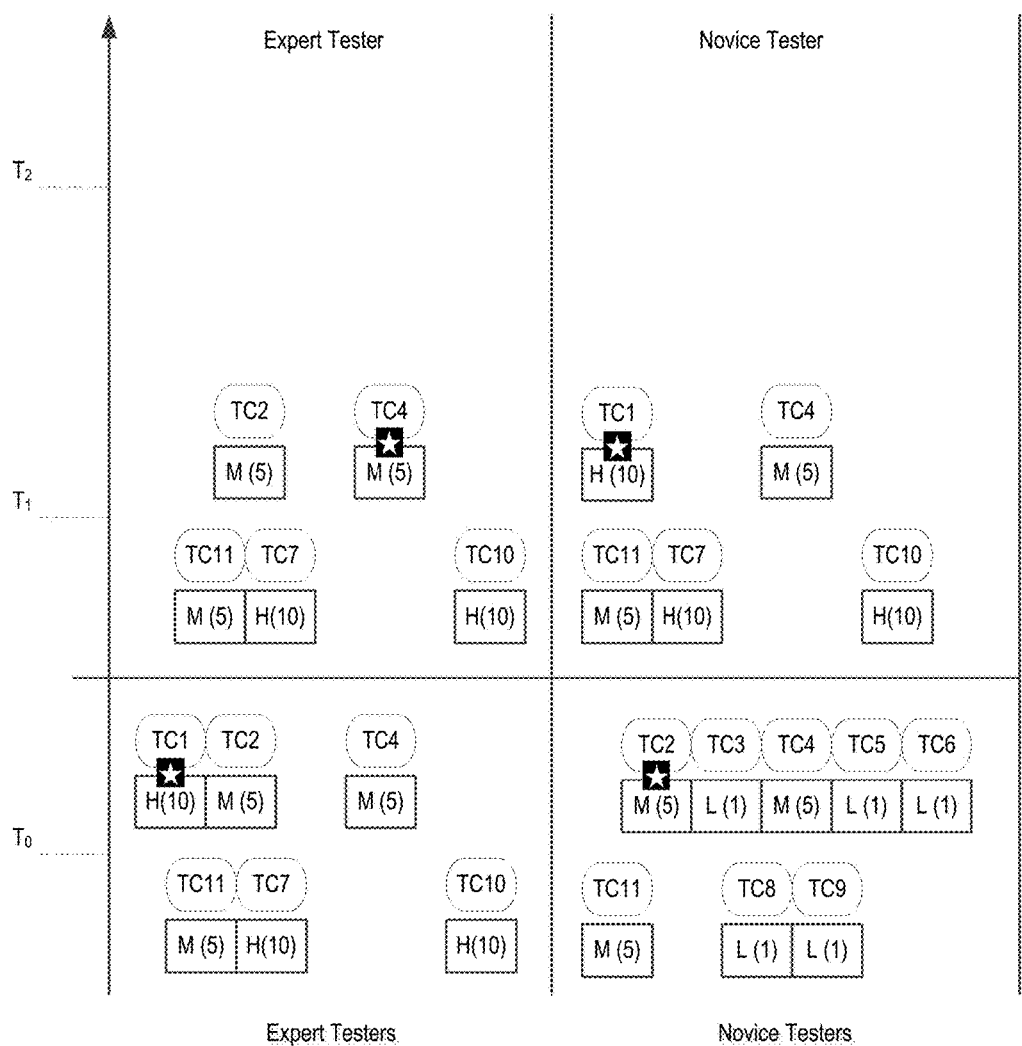
FIG. 8 shows an exemplary test case recommendation diagram for when historical data is available.

To improve upon the real-time suggestion strategy depicted by test case recommendation diagram 700, the test case recommendation described in the test case recommendation diagram 800 shown in FIG. 8 is generated by the coverage analyzer and reward engine 153 when historical test data is available. Based on the historical test data that is available and obtained by the coverage analyzer and reward engine 153, the coverage analyzer and reward engine 153 is able to selectively recommend certain test cases to different testers based on each tester's attributes. For example, testers having tester attribute data that have been analyzed to categorize them as expert level testers may be assigned test cases having higher priority levels (e.g., high and medium level priorities), as illustrated by the test case recommendation diagram 800. It follows that testers having tester attribute data that have been analyzed to categorize them as novice level testers (i.e., less skilled than expert level) may be assigned test cases having lower priority levels (e.g., mixture of medium and low level priorities), as illustrated by the test case recommendation diagram 800.

For example, the test case recommendation diagram 800 illustrates a mixture of high priority and medium priority level test cases (TC1, TC2, TC4, TC11, TC7, TC10) recommended for testing by expert level testers. The test case recommendation diagram 800 also illustrates a mixture of medium and low priority level test cases (TC2, TC3, TC4, TC5, TC6, TC11, TC8, TC9) recommended for testing by novice level testers. As illustrated by the test case recommendation diagram 800, there may be some test cases (e.g., TC11) that are recommended to testers across multiple different skill levels.

The test case recommendation diagram 800 illustrates a smarter real-time suggestion strategy that may be generated by the coverage analyzer and reward engine 153 when historical test data is available. The smarter real-time suggestion strategy allows the coverage analyzer and reward engine 153 to recommend certain test cases to certain testers based on the testers specific attributes. For example, when a tester's attributes indicates the tester has superior testing efficiency and/or effectiveness, such tester may be recommended for testing higher level priority test cases. Similarly, the coverage analyzer and reward engine 153 may recommend a tester for testing a particular test case when a tester's historical test case execution trace data indicates the tester has executed similar test cases.

The test case recommendation diagram 800 illustrates a smarter real-time suggestion strategy that may be generated by the coverage analyzer and reward engine 153 when historical test data is available to identify tester attributes. This way, the test case recommendation diagram 800 accounts for tester personas that are discovered through the analysis of the tester's past performance history, and assigning the testers to a tester persona group (e.g., a tester proficiency level including an expert level tester and a novice level tester, or grouping based on application tested). The tester persona groups may group testers based on the past testing performance determined for the individual testers related to either a particular type of application feature or reflecting an overall testing experience level of the tester.

Exemplary tester persona groups include an Explorer group that includes testers observed to have touched as many features as possible in the given time frame by testing at least one scenario in each feature. Such testers are included in the Explorer group because their primary focus is to understand the overall application first before moving to understand each feature more deeply. As their primary intent is to understand the application, Explorers focus on testing simple scenarios. Another tester persona group includes an Adventurer group that is similar to the Explorer group but focuses more on augmented scenarios. That is, although their primary focus is to understand the application, testers in the Adventurer group test augmented scenarios. Perhaps, the psychology for testers in the Adventurer group is that simple scenarios would anyway be tested by the development teams and therefore exploring augmented scenarios that involve additional actions would lead to interesting findings. Another tester persona group includes a Diver group, where testers in the Diver group are the opposite to the testers in the Explorer group, where some testers were found to spend time in first exploring most of the scenarios of one feature before moving to the next feature. So, testers in the Diver group have a tendency to traverse the application feature graph in depth first. Deep divers are those testers who spend a lot of time on testing only a few test case scenarios which are significantly complex. Another tester persona group includes a Breaker class including testers found to break the application being tested with the data inputs which are either not well formed, wrong, or have extreme values. For instance, in a hotel booking application, a tester trying to book the hotel for entire an year would be classified into the Breaker class. A Candy maker class includes testers who give correct and well-informed data values into the application being tested so that the application works as intended.

If a testing goal requires testers belonging to certain testing persona group categories, proper incentives or directions to the testers should be provided so that the desired testers accept a test case having the specific testing goal. Monitoring the tester's past testing performance and grouping testers into tester persona groups accordingly, further helps provide guided test case assignment recommendations that decrease redundancy of assigning the same test case to multiple testers, or the redundancy of assigning test cases to testers who have not been shown to perform the test case adequately in the past. Therefore, it is very important to understand the tester's behaviors and offer a right set of guidance. By discovering the tester's persona, the coverage analyzer and reward engine 153 generates the smarter real-time suggestion strategy represented by the test case recommendation diagram 800 that takes into account the tester's personal attributes.

Figure 9:
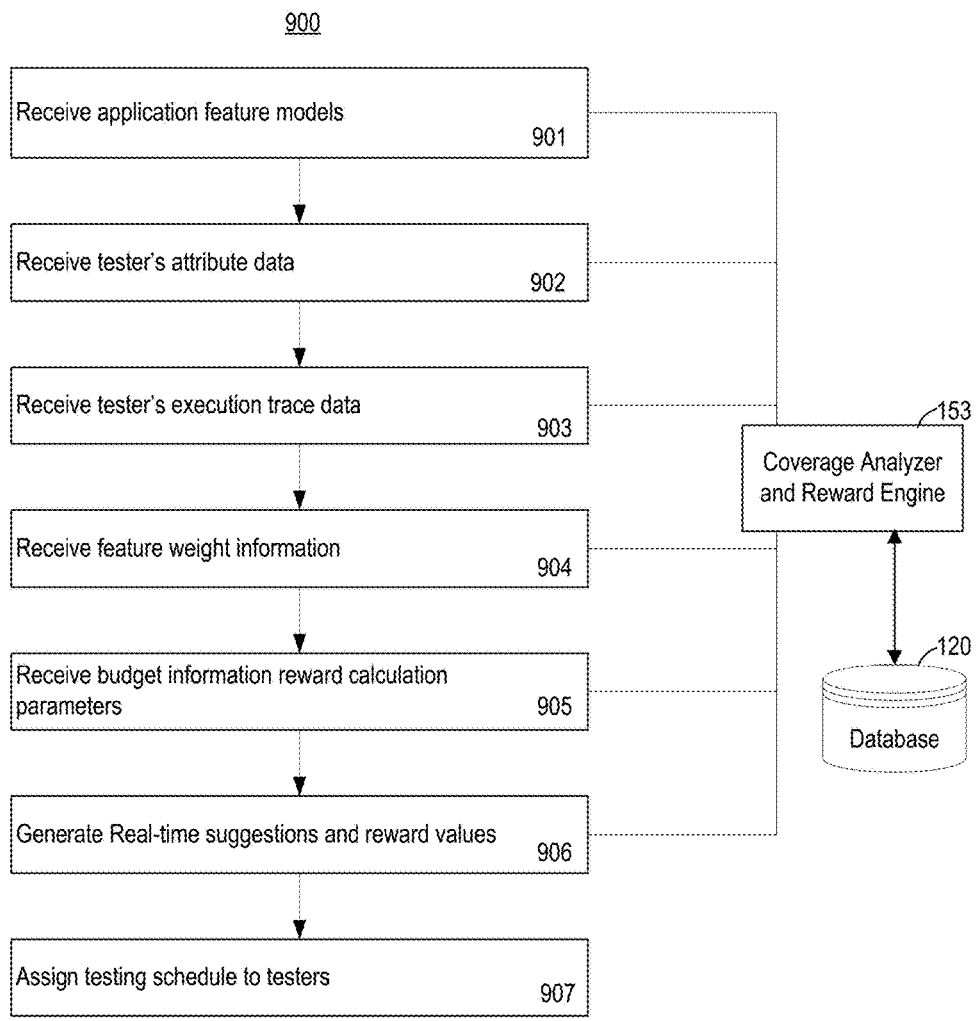
FIG. 9 shows an exemplary flow diagram of logic and corresponding components that may be implemented by using the application testing developer system.

FIG. 9 shows a flow diagram 900 of logic describing processes that may be included to implement portions of the real-time suggestions process 310 shown in FIG. 3. The processes described in the flow diagram 900 are attributable to the coverage analyzer and reward engine 153, where the coverage analyzer and reward engine 153 may retrieve data from the database 120 while implementing the real-time suggestions process 310.

Initially, the coverage analyzer and reward engine 153 receives an application feature model (901). The application feature model may be embodied by, for example, the application tree 400 shown in FIG. 4.

The coverage analyzer and reward engine 153 further receives a tester's attribute data (902). The tester's attribute date may include information describing the tester's efficiencies, effectiveness, strengths, weaknesses, or the like, that have been analyzed by the coverage analyzer and reward engine 153 based on previous test case executions by the tester. The attribute data may be retrieved from the database 120.

The coverage analyzer and reward engine 153 further receives the tester's execution trace data (903). The execution trace data may identify the tester's previously executed test cases, including each application node that has been executed, or left incomplete, in a test case started by the tester.

The coverage analyzer and reward engine 153 further receives weight information to assign to each application node in the application feature graph (904). The weight information may be retrieved, for example, from the database 120. The weight information may include weight values that represent a level of importance given to an application node in the application feature graph if the application node is traversed. The weight value is defined in terms of, but not limited to, priority and reliability of the feature to which the node belongs. For example, an important feature which is expected to be used by a majority of users, is given higher priority (thus a higher weight value). Under this strategy for assigning weight values, all the application nodes in the given feature will also have a higher weight value. Also, if a feature is reported to have lot of bugs, then the weight value for the feature may still be high as a test manager would want to promote more time on testing this feature to address the bugs. Whereas, a reward value is calculated based on weight values and how often the particular test case has been visited. If a test case with high weightage has already been explored multiple times, then the reward for that test case will be less than a test case with equally high weightage but which never got tested, or at least tested less.

The coverage analyzer and reward engine 153 then receives budget information and reward calculation parameters (905). The budget information includes a reward budget for each application node included in the application tree 400 that represents a testing activity which will be utilized for the later reward calculation. The budget information may be stored in the database 120, or another database in communication with the coverage analyzer and reward engine 153. The reward calculation parameters may include application feature priority information, application feature coverage information, and risks information for the application nodes included in the application features included in the application feature model (e.g., application nodes in the application tree 400). Both the budget information and the reward calculation parameters are utilized by the coverage analyzer and reward engine 153 a configuration parameters for generating reward values for the application features (e.g., application nodes). Both the budget information and the reward calculation parameters may be stored in the database 120, or other database in communication with the coverage analyzer and reward engine 153.

The coverage analyzer and reward engine 153 then generates real-time suggestions and reward values, as described herein (906). The real-time suggestion may be a proposed allocation of testers to the test application features for assigning testers to the test application features of the test application based on the application feature graph, the tester attribute information, and the application feature weight information. The rewards values may be representative rewards values assigned to each of the application nodes to promote testing by testers. Testers that execute the application feature represented by the application node will recoup the assigned reward values, where the reward values accumulated by the testers may later be converted for tangible rewards such as monetary bonuses.

The coverage analyzer and reward engine 153 further assigns testing schedules to testers based on the real-time suggestions (907). The testing schedules assign certain application features to be tested by certain testers. The assignments are based on the testers availability, matching application features and testers based on tester's past performance testing similar or the same application features, and/or assigning higher weighted or reward value application features to higher rated testers.

The testing schedules are presented to test managers, as well as to the testers. The test managers receives testing schedules and makes a final determination as to which application features to assign to which testers for testing. The testers receive the testing schedules to see the available reward values that have been assigned to each testing feature and become motivated to accepting test cases accordingly. The testers and test managers receive the suggested testing schedules in real-time, which makes the testing environment being monitored by the smart advisory tool 150 more autonomous as testers themselves choose more promising test cases in order to achieve higher reward and thus relieving the test manager from having to directly allocate test cases in some situations.

Figure 10:
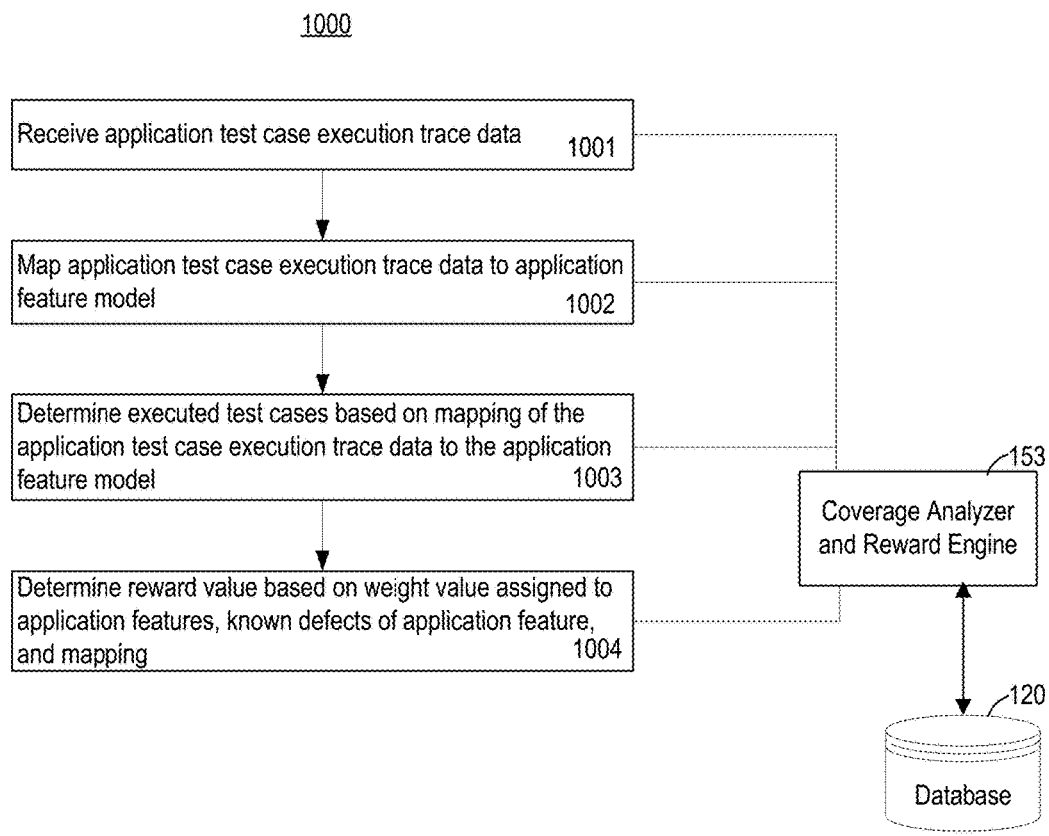
FIG. 10 shows an exemplary flow diagram of logic and corresponding components that may be implemented by using the application testing developer system.

FIG. 10 shows a flow diagram 1000 of logic describing processes that may be included to implement portions of the real-time suggestions process 310 shown in FIG. 3. The processes described in the flow diagram 1000 are attributable to the coverage analyzer and reward engine 153, where the coverage analyzer and reward engine 153 may retrieve data from the database 120 while implementing the real-time suggestions process 310.

Initially, the coverage analyzer and reward engine 153 receives an application's test case execution trace data (1001). The test case execution trace data may identify the test cases that have been verified by the test execution validator engine 152 as being completed. The test case execution trace data may also identify test cases that have been partially completed, where not all application nodes in the test case have been executed by a tester.

The coverage analyzer and reward engine 153 then maps the application test case execution trace data to the application feature model, where the application feature model may be embodied by the application tree 400 shown in FIG. 4 (1002).

By mapping the application test case execution trace data to the application feature model, the coverage analyzer and reward engine 153 determines which test cases, either completely or partially, have been executed (1003).

The coverage analyzer and reward engine 153 then determines reward values to assign to the remaining application nodes in the test cases that have not been completely executed based on the weight values assigned to the application features, known defects of the application features, and the mapping that identifies which test cases, either completely or partially, have been executed (1004). The known defects of the application features may have been recorded and stored into the database 120. The defects relate to defects in the application that have been discovered during the testing process. A test case included in an application feature known to have a defect may be assigned a higher reward value so that a tester may be more highly motivated to execute the test case to find and cure the defect.

In addition, the coverage analyzer and reward engine 153 may further consider the budget information and the reward calculation parameters when determining the reward values to assign to the remaining application nodes in the test cases that have not been completely executed in addition to the weight values assigned to the application features, known defects of the application features, and the mapping that identifies which test cases, either completely or partially, have been executed (1004).

Referring back to the work allocation process 320 shown in FIG. 3, the work allocation engine 151 may receive testing data and generate test case work allocation recommendations 322 based on the received testing data. The testing data may include a current work allocation, application feature data, application work allocation history data, and tester attribute data. The work allocation engine 151 may further receive information identifying test cases 325 for the application 311 being tested. The work allocation engine 151 may further receive validation confirmations from the test execution validator engine 152 that validates test cases that have been completely executed.

The work allocation recommendations 322 identifies specific application features that are recommended to be tested by specific testers. The work allocation recommendations 322 is then presented to a test manager 323, and the test manager 323 selects the final work allocation schedule that assigns testing of specific application features to specific testers. The final work allocation schedule may then be cycled back to the work allocation engine 151 as the current work allocation data.

Figure 11:
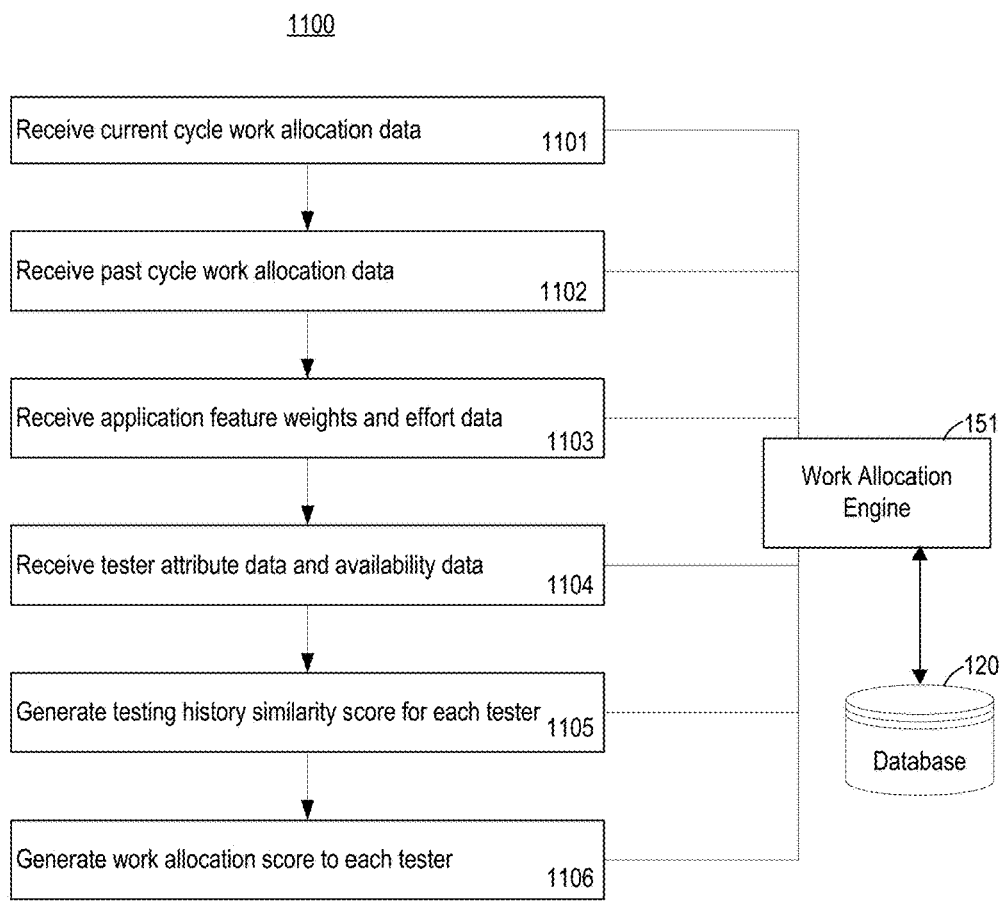
FIG. 11 shows an exemplary flow diagram of logic and corresponding components that may be implemented by using the application testing developer system.

FIG. 11 shows a flow diagram 1100 of logic describing processes that may be included to implement portions of the work allocation process 320 shown in FIG. 3. The processes described in the flow diagram 1100 are attributable to the work allocation engine 151, where the work allocation engine 151 may retrieve data from the database 120 while implementing the work allocation process 320.

Initially, the work allocation engine 151 receives current work allocation data (1101). The current work allocation data may identify a current scheduling of test cases assigned to be tested by selected testers.

The work allocation engine 151 further receives past cycle work allocation data (1102). The past cycle work allocation data may identify past scheduling of test cases tested by selected testers.

The work allocation engine 151 further receives application feature weight values and effort data (1103). Effort data for a test case describes how much effort is required to execute the test case. One way to calculate the effort is how many actions a tester takes for executing the test case. Other aspect of effort is based on how much test inputs the needs to vary to test the application for a given test goal. Another way to calculate effort data is to estimate the effort from past data describing the time needed to execute similar test cases. The data referenced for determining the effort data is available in the database 120. The weight value assigned to application features may correspond to the weight values shown for the feature-priority mapping table 600 shown in FIG. 6.

The work allocation engine 151 further receives tester attribute data and tester availability data (1104). The work allocation engine 151 then generates a testing history similarity score for each tester based on the received information (1105). The testing history similarity score relates to the tester's experience testing application features that are determined to be similar to an application feature to be tested from the application 311. For example, the similarity score may be higher when the tester is determined to have been efficient or effective when previously testing a similar application feature as the application feature to be tested from the application 311. The similarly score may likewise be higher based on how similar a previously tested application feature is to the application feature to be tested from the application 311.

Figure 12:
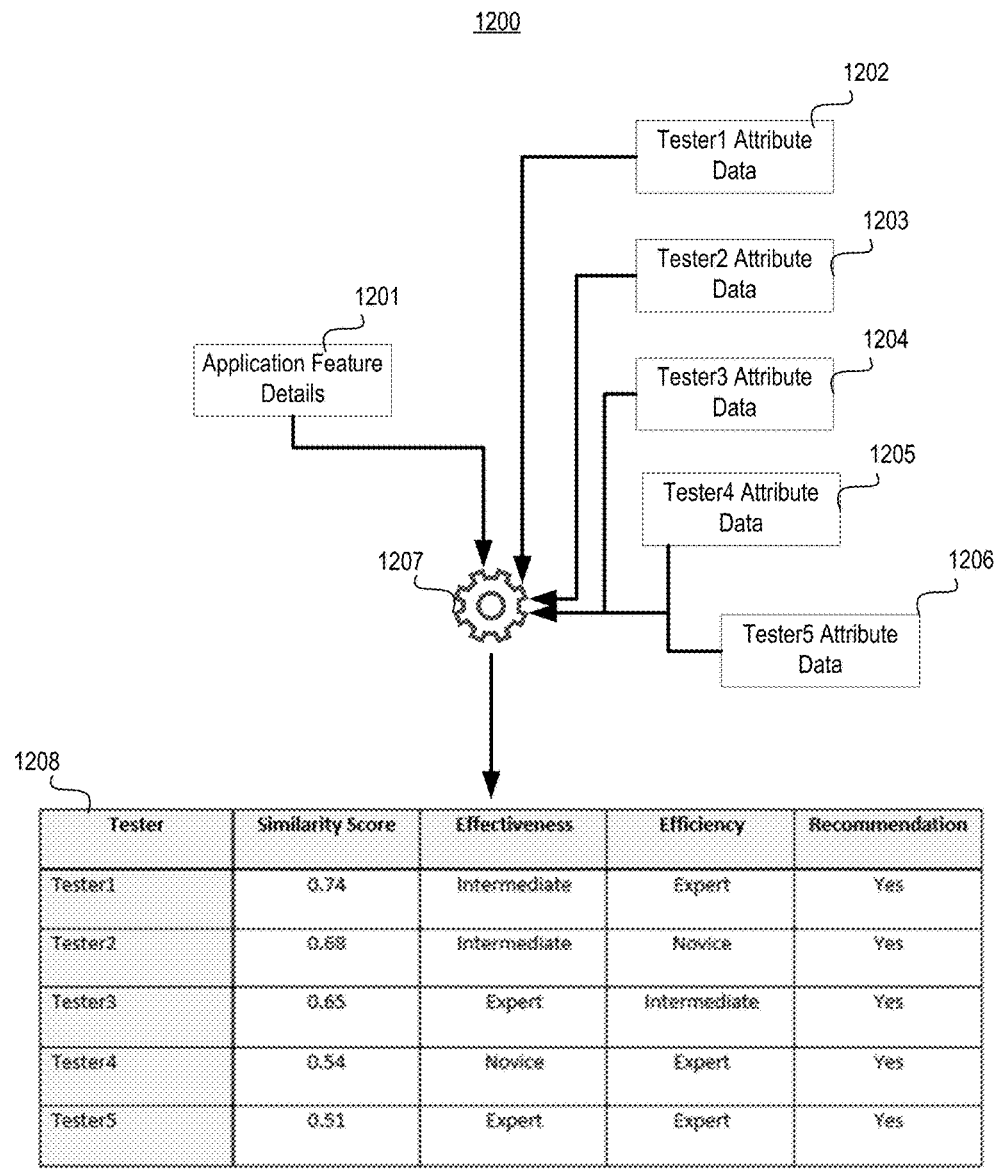
FIG. 12 shows an exemplary block diagram for a similarity analytics engine.

FIG. 12 shows an exemplary block diagram 1200 for a similarity analytics engine 1207 configured to generate a similarity score for a group of available testers. The similarity analytics engine 1207 may be included as part of the work allocation engine 151. The similarity analytics engine 1207 is shown to receive application feature details. The application feature details may relate to an application domain (e.g., banking), application name (e.g., My Bank), and application features (e.g., login, brokerage, money transfer, log out, pay bill, support, account inquiry, bank branches). The similarity analytics engine 1207 also receives tester attribute data for the group of available testers, Tester1-Tester5. The tester attribute date may include details related to the tester such as application domains previously tested by the tester (e.g., banking, retail, Telecom), names of applications previously tested by the tester (e.g., My Bank, My Retail, My Telecom), and application features previously tested by the tester (e.g., login, money transfer, log out, pay bill, support, account inquiry, shipping, catalog, shopping cart, offers, payment, broadband plans). The similarity analytics engine 1207 may then generate a similarity score table 1208 that includes similarity scores for each tester in the group, Tester1-Tester5. The similarity score table 1208 may also include an effectiveness level score for testing similar application features, an efficiency level score for testing similar application features, and a recommendation for the respective tester to test the application feature being considered for tested from the application 311.

Referring back to the flow diagram 1100, the work allocation engine 151 generates a work allocation score to each tester based on their assigned similarity score (1106). For example, FIG. 15 shows a work allocation score table 1500 that may be generated by the work allocation engine 151. The work allocation score table 1500 identifies four application features (F1-F4) and three available testers (Tester 1-Tester 3).

For the first application feature F1, the work allocation engine 151 has generated a work allocation score of 0.50 for Tester 1, 0.34 for Tester 2, and 0.12 for Tester 3. Based on these work allocation scores, Tester 1 has the highest score, thus indicating that Tester 1 has been recommended by the work allocation engine 151 to test the first application feature F1 relating to an application login feature.

For the second application feature F2, the work allocation engine 151 has generated a work allocation score of 0.23 for Tester 1, 0.41 for Tester 2, and 0.45 for Tester 3. Based on these work allocation scores, Tester 3 has the highest score, thus indicating that Tester 3 has been recommended by the work allocation engine 151 to test the second application feature F2 relating to a support feature.

For the third application feature F3, the work allocation engine 151 has generated a work allocation score of 0.55 for Tester 1, 0.61 for Tester 2, and 0.35 for Tester 3. Based on these work allocation scores, Tester 2 has the highest score, thus indicating that Tester 2 has been recommended by the work allocation engine 151 to test the first application feature F3 relating to a brokerage feature.

For the fourth application feature F4, the work allocation engine 151 has generated a work allocation score of 0.20 for Tester 1, 0.48 for Tester 2, and 0.41 for Tester 3. Based on these work allocation scores, Tester 2 has the highest score, thus indicating that Tester 2 has been recommended by the work allocation engine 151 to test the fourth application feature F1 relating to an application log out feature.

By generating the work allocation score table 1500, the test manager 323 may select the tester determined by the work allocation engine 151 to be most qualified for testing each of the application features.

Referring back to the test execution validation process 330 shown in FIG. 3, the test execution validator engine 152 may implement the test execution validation process 330 to validate test cases that have been successfully completed by testers. To validate the test cases, the test execution validator engine 152 may receive test case execution trace data 312 and application test models 327. As described, the application test models 327 may be in the data format of application tree 400. The resulting validation data generated by the test execution validator engine 152 may be in the data format of an exemplary execution trace and validation table 1300 as shown in FIG. 13. The execution trace and validation table 1300 relates to the application nodes from application tree 400 shown in FIG. 4.

The execution trace and validation table 1300 includes validation data for test cases of the application 311 being tested. For test case 1 (TC1) that includes application nodes 1-7 and 9, the execution trace and validation table 1300 shows that all the application nodes 1-7 and 9 of TC1 have been successfully executed by a tester. Therefore, the execution trace and validation table 1300 validates TC1 as being successfully executed.

For test case 2 (TC2) that includes application nodes 1-8 and 10, the execution trace and validation table 1300 shows that application nodes 1-4 have been successfully executed, and also that application nodes 5-8 and 10 have not been executed. Therefore, the execution trace and validation table 1300 does not validate TC2 as being successfully executed, and instead identifies TC2 as being a partial, incomplete execution.

For test case 3 (TC3) that includes application nodes 1 and 11-16, the execution trace and validation table 1300 shows that all the application nodes 1 and 11-16 of TC3 have been successfully executed by a tester. Therefore, the execution trace and validation table 1300 validates TC3 as being successfully executed.

For test case 4 (TC4) that includes application nodes 1, 11, and 17-20 the execution trace and validation table 1300 shows that application nodes 1, 11, and 17-18 have been successfully executed, and also that application nodes 19 and 20 have not been executed. Therefore, the execution trace and validation table 1300 does not validate TC4 as being successfully executed, and instead identifies TC4 as being a partial, incomplete execution.

Different weight values and/or reward values may be assigned to the test nodes based on whether the test nodes are validated by the test execution validator engine 152 as being successfully executed. For example, test nodes that are validated as being successfully executed may be assigned a low, or zero, weight and/or reward value. Conversely, the same test nodes that are determined to only being partially executed, or incomplete, may be assigned a higher value to promote the test case for execution by a tester. In some embodiments, test nodes that are determined as being successfully executed may still be assigned a higher weight and/or reward value when previous testing of the test case found technical issues with the test case requiring further testing before validating as operating as intended without the technical issues.

Similarly, as an application feature is described as including one or more test cases, different weight values and/or reward values may be assigned to the overall corresponding application feature based on whether all, or less than all, of the test nodes that comprise the application feature are validated. For example, application features that are validated as having all their test cases successfully executed may be assigned a low, or zero, weight and/or reward value. Conversely, the same application feature that is determined to only having some, but not all, of their test cases validated may be assigned a higher value to promote the application feature for execution by a tester. In some embodiments, application features that are determined as being successfully executed may still be assigned a higher weight and/or reward value when previous testing of the application feature found technical issues with the application feature requiring further testing before validating as operating as intended without the technical issues.

Figure 14:
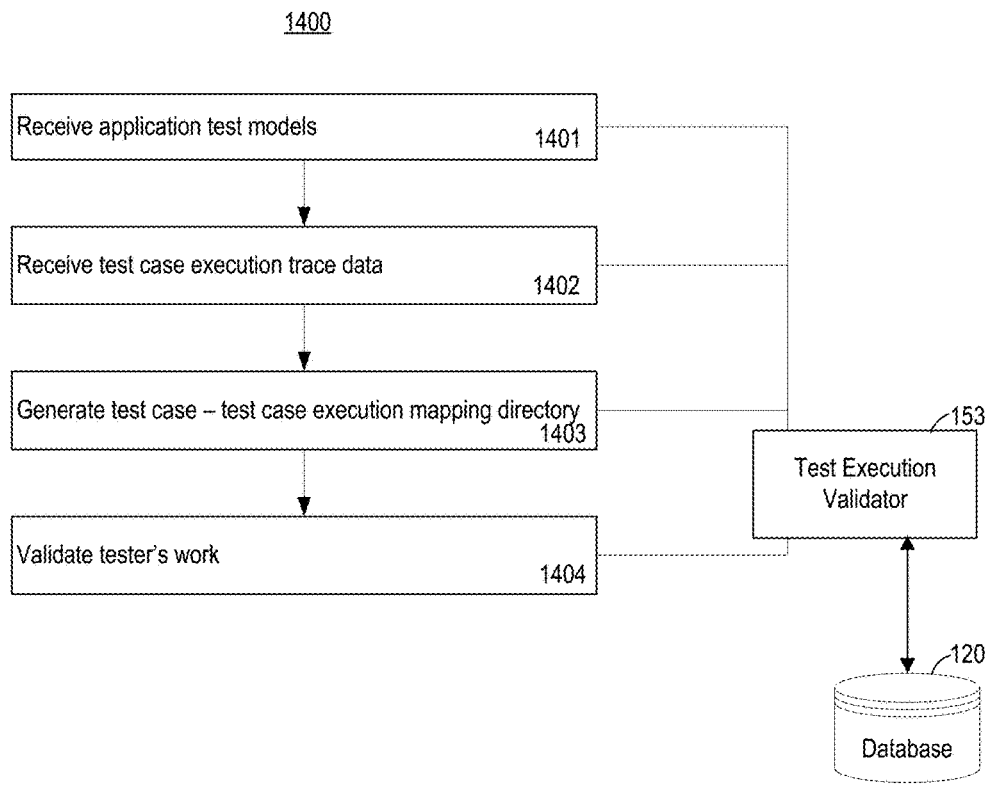
FIG. 14 shows an exemplary flow diagram of logic and corresponding components that may be implemented by using the application testing developer system.

FIG. 14 shows a flow diagram 1400 of logic describing processes that the smart advisory tool 300 may implement to execute portions of the test execution validation process 330 shown in FIG. 3. The processes described in the flow diagram 1400 are attributable to the test execution validator engine 152, where the test execution validator engine 152 may retrieve data from the database 120 while implementing the test execution validation process 330.

The test execution validator engine 152 receives application test models for the application 311 being tested (1401). The test execution validator engine 152 receives test case execution trace data, and stores the test case execution trace data in the database 120 (1402).

The test execution validator engine 152 generates a test case—test case execution mapping directory (1403). The test case—test case execution mapping directory may include a mapping of the application nodes known to be executed against the entire set of application nodes for the application 311 being tested. This way, the test case—test case execution mapping directory identifies those application nodes that have been executed from those application nodes that have not yet been executed, much like the information shown in the execution trace and validation table 1300 described in FIG. 13.

The test execution validator engine 152 may validate test cases and tester's work product by reviewing the test case—test case execution mapping directory. The resulting data set produced by the test execution validator engine 152 may be in the data format of the execution trace and validation table 1300 described in FIG. 13.

The methods, devices, processing, circuitry, and logic described above may be implemented in many different ways and in many different combinations of hardware and software. For example, all or parts of the implementations may be circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, or may implement its functionality in hardware alone. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed. For instance, the circuitry may include multiple distinct system components, such as multiple processors and memories, and may span multiple distributed processing systems. Parameters, databases, and other data structures may be separately stored and managed, may be incorporated into a single memory or database, may be logically and physically organized in many different ways, and may be implemented in many different ways. Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways.

What is claimed is:

1. A method for validating test cases during testing of a test application, the method comprising:
   receiving, through a network interface, an application feature graph for the test application, wherein the application feature graph comprises a data tree linking a series of associated application nodes to an application feature available in the test application;
   receiving, through the network interface, test case execution trace data from a database, wherein the test case execution trace data identifies executed test cases included in the application feature that have been executed by a tester;
   mapping, by a test execution validator, the executed test cases with the application nodes in the application feature;
   validating, by the test execution validator, the application feature as being successfully executed when the executed test cases are mapped to all the application nodes in the application feature;
   receiving, by a work allocation engine, tester attribute information; and
   generating a proposed allocation of testers to the test application features based on the tester attribute information and whether the application feature is validated.

2. The method of claim 1, further comprising:
   determining, by the test execution validator, the application feature is partially executed when the executed test cases are mapped to at least one, but not all, of the application nodes in the application feature.

3. The method of claim 2, further comprising:
   assigning, by the test execution validator, a reward value to the application nodes based on whether the application nodes are mapped to an executed test case.

4. The method of claim 2, further comprising:
   assigning, by the test execution validator, a reward value to the application feature based on whether the application feature is validated.

5. The method of claim 4, further comprising:
assigning, by the test execution validator, a higher reward value to the application feature when the application feature is identified as including a known defect detected based on prevising testing of the application feature.

6. The method of claim 1, wherein the tester attribute information includes at least one of a testing strength or testing weakness of a tester.

7. The method of claim 1, further comprising:
receiving, by the work allocation engine, updated test case execution trace data from the database, wherein the updated test case execution trace data identifies an updated list of executed test cases included in the application feature that have been executed by the tester;
mapping, by the test execution validator, the updated executed test cases with the application nodes in the application feature;
validating, by the test execution validator, the application feature as being successfully executed when the updated list of executed test cases are mapped to all the application nodes in the application feature; and
revising, by the work allocation engine, the proposed allocation into a revised proposed allocation based on the tester attribute information and whether the application feature is validated.

8. The method of claim 7, further comprising:
revising, by the test execution validator, the reward value assigned to the application feature based on whether the application feature is validated.

9. The method of claim 1, further comprising:
assigning, by a work allocation engine, a priority level to the application feature; and
generating, by the work allocation engine, a proposed allocation of testers to the test application features based on whether the application is validated and tester ratings.

10. A computing device for validating test cases during testing of a test application, the computing device comprising:
a machine-readable medium, other than a transitory signal; and
instructions stored on the machine-readable medium, the instructions configured to, when executed, cause processing circuitry to:
control a network interface to:
receive, from a database, an application feature graph for the test application, wherein the application feature graph comprises a data tree linking a series of associated application nodes to an application feature available in the test application; and
receive, from a database, test case execution trace data from a database, wherein the test case execution trace data identifies executed test cases included in the application feature that have been executed by a tester; control a test execution validator to:
map the executed test cases with the application nodes in the application feature; and
validate the application feature as being successfully executed when the executed test cases are mapped to all the application nodes in the application feature; and control a work allocation engine to:
receive tester attribute information; and
generate a proposed allocation of testers to the test application features based on the tester attribute information and whether the application feature is validated.

11. The computing device of claim 10, wherein the instructions are further configured to, when executed, cause the processing circuitry to control the test execution validator to:
determine the application feature is partially executed when the executed test cases are mapped to at least one, but not all, of the application nodes in the application feature.

12. The computing device of claim 11, wherein the instructions are further configured to, when executed, cause the processing circuitry to control the test execution validator to:
assign a reward value to the application nodes based on whether the application nodes are mapped to an executed test case.

13. The computing device of claim 11, wherein the instructions are further configured to, when executed, cause the processing circuitry to control the test execution validator to:
assign a reward value to the application feature based on whether the application feature is validated.

14. The computing device of claim 13, wherein the instructions are further configured to, when executed, cause the processing circuitry to control the test execution validator to:
assign a higher reward value to the application feature when the application feature is identified as including a known defect detected based on prevising testing of the application feature.

15. The computing device of claim 11, wherein the tester attribute information includes at least one of a testing strength or testing weakness of a tester.

16. The computing device of claim 11,
wherein the instructions are further configured to, when executed, cause the processing circuitry to control the work allocation engine to:
receive updated test case execution trace data from the database, wherein the updated test case execution trace data identifies an updated list of executed test cases included in the application feature that have been executed by the tester; and
wherein the instructions are further configured to, when executed, cause the processing circuitry to control the test execution validator to:
map the updated executed test cases with the application nodes in the application feature;
validate the application feature as being successfully executed when the updated list of executed test cases are mapped to all the application nodes in the application feature; and
wherein the work allocation engine is further configured to:
revise the proposed allocation into a revised proposed allocation based on the tester attribute information and whether the application feature is validated.

17. The computing device of claim 16, wherein the instructions are further configured to, when executed, cause the processing circuitry to control the test execution validator to:
revise the reward value assigned to the application feature based on whether the application feature is validated.

18. The computing device of claim 1, wherein the instructions are further configured to, when executed, cause the processing circuitry to control a work allocation engine to:
 assign a priority level to the application feature; and
 generate a real-time suggestion for assigning testers to test the application feature based on whether the application is validated and tester ratings.

* * * * *